(12) United States Patent
Larkin

(10) Patent No.: US 8,170,181 B1
(45) Date of Patent: May 1, 2012

(54) COMPACT MULTIFUNCTION 5-TERMINAL TYPE COMPATIBLE TELEPHONE LINE TESTER

(75) Inventor: Kevin B. Larkin, Pebble Beach, CA (US)

(73) Assignee: Kevin B. Larkin, Santa Cruz, CA (US)

( * ) Notice: Subject to any disclaimer, the term of this patent is extended or adjusted under 35 U.S.C. 154(b) by 1289 days.

(21) Appl. No.: 11/841,673

(22) Filed: Aug. 20, 2007

(51) Int. Cl.
*H04M 1/24* (2006.01)
*H04M 3/08* (2006.01)
*H04M 3/22* (2006.01)

(52) U.S. Cl. ...................................... 379/21; 379/27.05
(58) Field of Classification Search .................... 379/21, 379/27.05, 27.07, 29.11, 412, 413.02, 413.04
See application file for complete search history.

(56) References Cited

U.S. PATENT DOCUMENTS

| | | | | |
|---|---|---|---|---|
| 4,209,671 A | * | 6/1980 | Charles et al. ................... | 379/21 |
| 4,288,660 A | * | 9/1981 | Fasano ....................... | 379/27.08 |
| 5,175,662 A | * | 12/1992 | DeBalko et al. ............... | 361/119 |
| 5,260,994 A | * | 11/1993 | Suffi ......................... | 379/413.04 |
| 5,687,213 A |   | 11/1997 | Larkin | |
| 6,185,083 B1 | * | 2/2001 | Mathieu et al. ............... | 361/119 |
| 6,418,195 B1 | * | 7/2002 | Autry et al. ..................... | 379/21 |
| 7,778,003 B2 | * | 8/2010 | Metral et al. .................. | 361/119 |
| 2008/0220645 A1 | * | 9/2008 | Feldman ....................... | 439/490 |

\* cited by examiner

*Primary Examiner* — Quoc D Tran
(74) *Attorney, Agent, or Firm* — Morgan, Lewis & Bockius LLP

(57) ABSTRACT

A compact multifunction 5-terminal type compatible telephone line tester has batteries fitted in its frontal access shaft that fits into a to be tested connector between tightly arrayed protectors assembled in a cross connect box. A light powered by the battery is integrated at the tester front face in between the connection pins. The protector removed from the to be tested connector may be inserted in a terminal that laterally extends from the tester. An electric circuit tests and indicates the protector condition and switches the light on upon manual pushing of a switch. The electric circuitry is powered by the batteries. A mechanical switch is actuated by the protector housing while the protector is connected to the terminal for automated protector through connection to the to be tested connector. Lateral terminals and a jack connector on the back side provide access to the connector.

18 Claims, 5 Drawing Sheets

COMPACT MULTIFUNCTION 5-TERMINAL TYPE COMPATIBLE TELEPHONE LINE TESTER

CROSS REFERENCE

The present invention cross references U.S. Pat. No. 5,687,213 of the same inventor, which is hereby incorporated by reference.

FIELD OF INVENTION

The present invention relates to 5-terminal type connector compatible telephone line testers. In particular, the present invention relates to multifunction 5-terminal type connector compatible telephone line tester featuring an integrated power source and circuitry for automatic protector testing and through connecting and/or for coupling face positioned illumination.

BACKGROUND OF INVENTION

In house wired telecommunication infra structure is commonly centrally connected to outside lines via cross connect boxes in which a number of outside lines are through connected with a number of in house lines across well known protectors. Cross connect boxes may also be found anywhere in the field as central telephone line testing locations. Protectors act as fuses that block abnormal signals such as voltage spikes or sneak current peaks between in house and outside lines. A protector is commonly electrically simultaneously connected to the well known tip and ring wires of corresponding in house and outside line as well as to an electrical ground. A common connector type for connecting up to five electrical leads in a single connector is the well known 5-terminal type compatible telephone line connector standard as is also described in more detail in the cross referenced patent of the same inventor.

Cross connect boxes may feature a large number of densely arrayed 5-terminal type telephone line connectors with tightly spaced protectors inserted. Diagnostic of in house and outside lines via the telephone line connectors may include visual inspection of the telephone line connector for eventual conductance degrading corrosion, operational testing of the protector as well as electrically accessing tip and ring wires of in house and out side lines for well known signal testing preferably while the protector is kept in use. Therefore there exists a need for a compact 5-terminal type telephone line connector compatible telephone line tester that provides for close illumination of the 5-terminal type connector for visual inspection and for visual connection alignment monitoring. Further, there exists also a need for operational testing of the protector, electrical access to all four signal wires with and without concurrent protector connection. The present invention addresses these needs.

SUMMARY

A compact multifunction 5-terminal type connector compatible telephone line tester has an integrated power source of two AAAA type batteries that are fitted in the frontal access shaft of the telephone line tester. The access shaft has an cross section boundary that corresponding to that of the protector so that it can be inserted in between tightly arrayed protectors assembled in a cross connect box. In between the frontal connect pins of the access shaft is integrated a light source powered by the power source for a most direct illumination of the to be tested 5-terminal type connector.

The telephone line tester may be conveniently hand held at its back portion for illuminated approach to the to be tested 5-terminal type connector. At the same time, the protector, previously removed from the to be tested 5-terminal type connector, may be electrically connected to a protector terminal laterally extending from the back portion of the telephone line tester. Electric and electronic circuitry that connects to the protector terminal and the front connector provides for optional protector testing and protector through connection with the front connector.

Protector testing and light source switching is preferably manually initiated via a push switch. An additional mechanical protector position switch adjacent the protector terminal may through connect the protector automatically once it is connected to the protector terminal. Dual visual information of a good and bad protector condition is preferably provided by a dual light LED. The protector testing including the LED are also powered by the integrated power source. Once the telephone line tester is connected with the to be tested 5-terminal type connector, the individual tip and ring wires of both in house and outside lines may be accessed at terminals lateral and at the back portion of the telephone line tester and/or via a well known jack connector at the back side of the telephone line tester.

DETAILED DESCRIPTION

Figure 1:
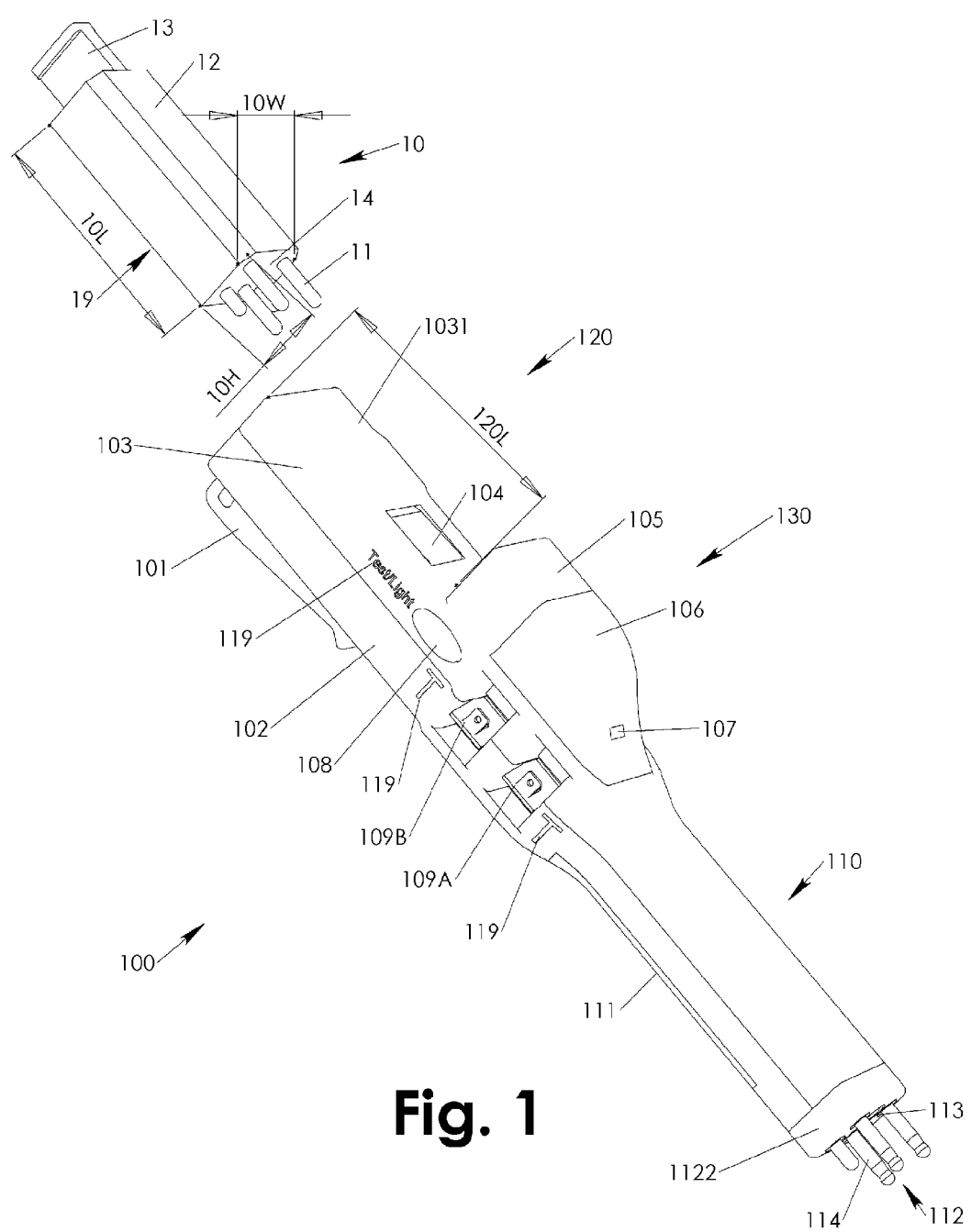
FIG. 1 depicts in a first perspective view a preferred telephone line tester of the present invention together with a prior art protector in assembly approach position
Figure 2:
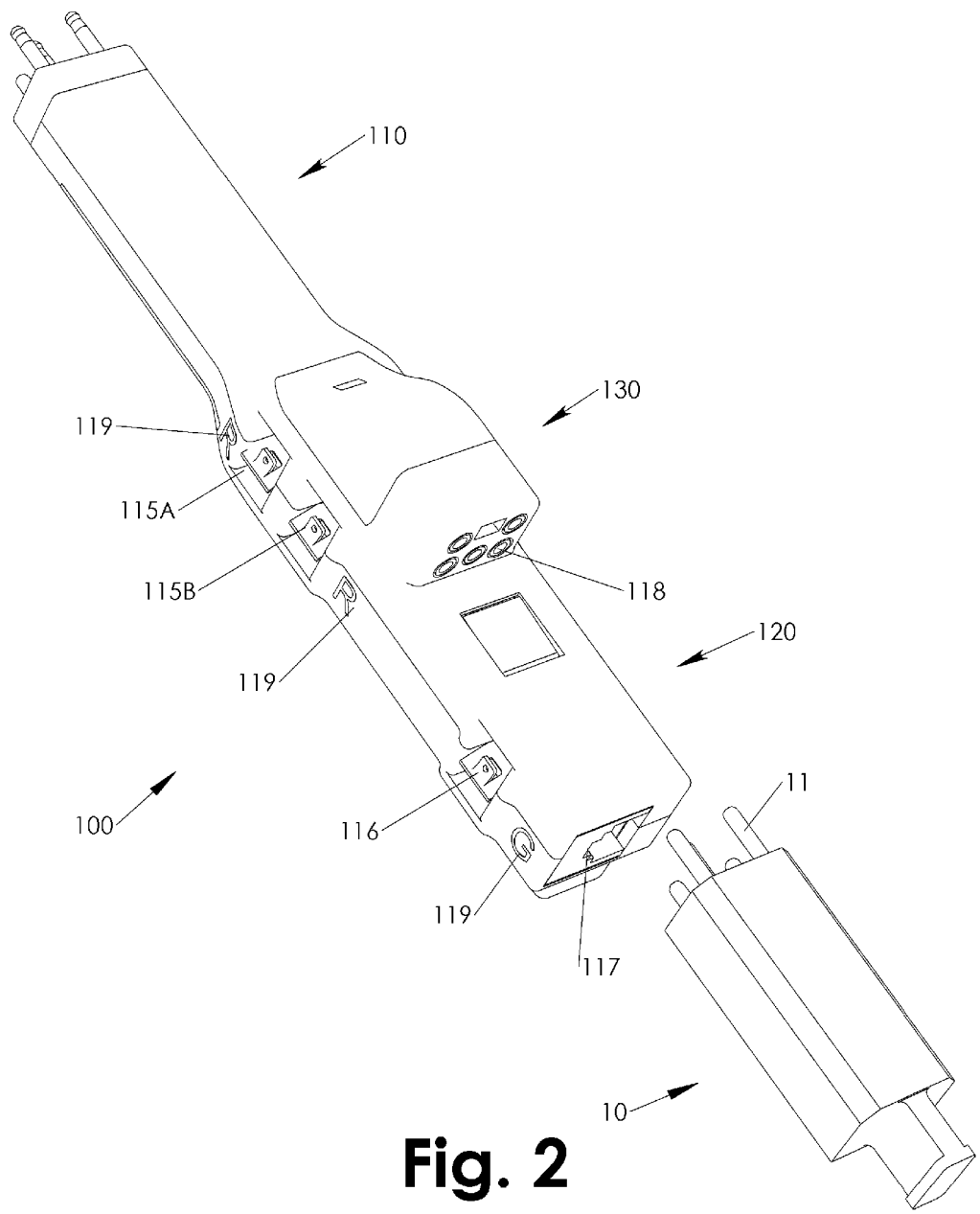
FIG. 2 is a second perspective view of the elements of FIG. 1.
Figure 3:
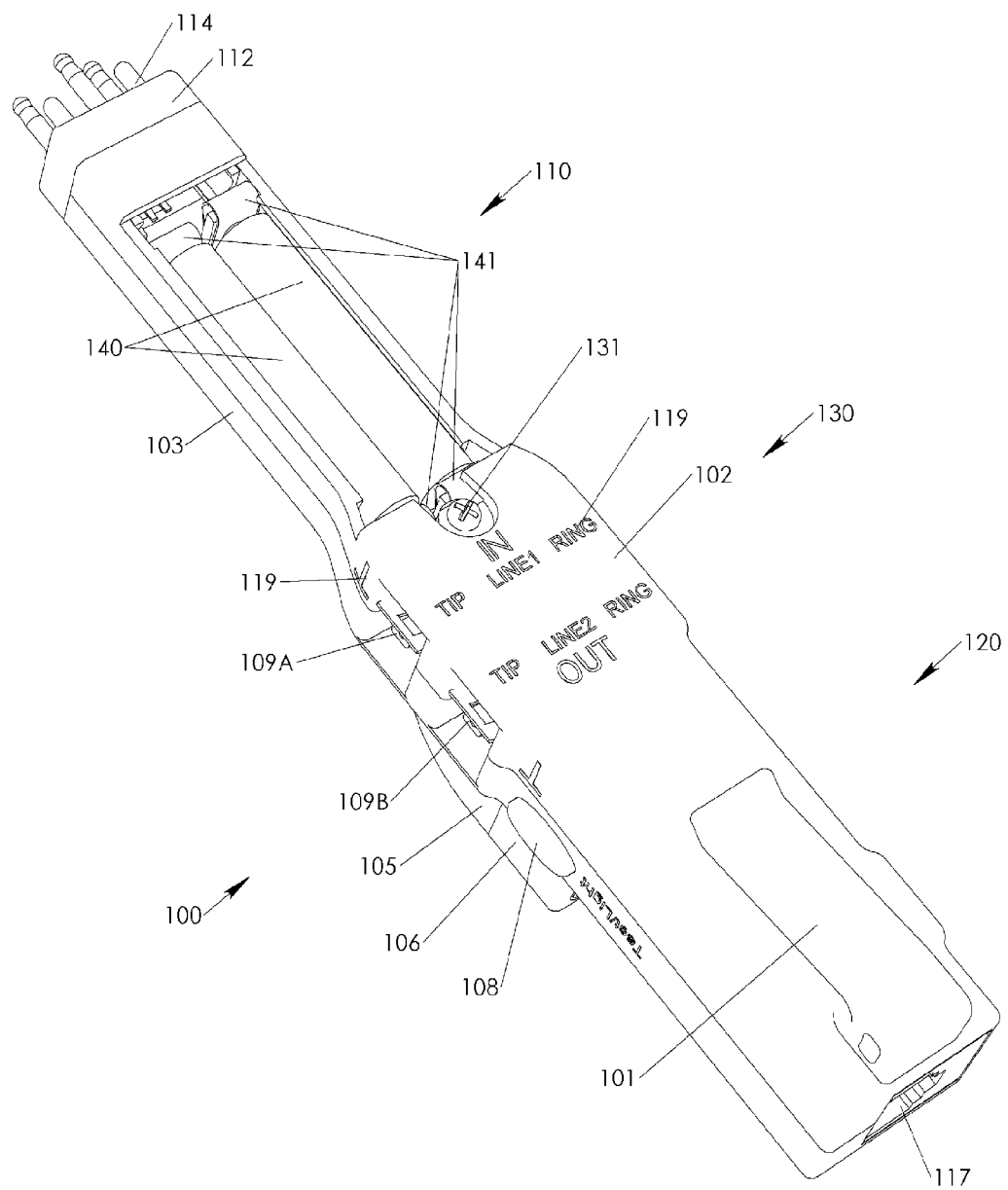
FIG. 3 is a third perspective view on the bottom side of the telephone line tester of FIG. 1 with a battery lid removed.

A telephone line tester 100 in accordance with the preferred embodiment of the invention includes a power source in the preferred configuration of two well known AAAA type batteries fitted in a frontal access shaft 110 that has an outer cross section boundary that is within an outer protrusion contour of a well known 5-terminal type telephone line connector. The outer protrusion contour such as the one of prior art protector 10 may be defined by a protector width 10W of about 19.2 mm and a protector height 10H of about 13 mm. The outer cross section boundary may be defined by a shaft width 110W and a shaft height 110H.

The telephone line tester 100 further includes a protector connector socket 105 with up to five protector receiving contacts 118 in which the contacts 11 of a well known protector 10 are inserted up to the point where the protector front face 14 touches the protector connector socket 105. Thereby, the protector contacts 11 are electrically and structurally connected such that the protector 10 is structurally fixed with respect to the telephone line tester 100 and electrically accessed at the same time.

The protector connector socket 105 is preferably positioned with respect to the elongate housing 102/103 such that a tester rear portion 120 with a rear portion length 120L that is about equal to a protector housing length 10L is available for an ergonometric fix of the protector 10. The ergonometric fix provides for a convenient handling of the telephone line tester 100 unimpeded by the attached protector 10. The ergonometric fix further provides for minimal risk of inadvertent lateral bending of the protector 10 with respect to the protector connector socket 105 and consequently minimal risk of structural damage of the protector contacts 11 while the protector 10 is connected to the telephone line tester 100. In addition, the ergonometric fix provides also for an easy access to the protector handle 13 for removing the protector 10 again from the protector connector socket 105.

While the protector 10 is connected to the protector connector socket 105 via protector receiving contacts 118, a protector testing and switching circuitry is electrically through connecting the prior art protector 10 with corresponding frontal contact pins 114. Alternately to through connecting the protector 10, the testing and switching circuitry may be activated by a test and light switch 108 for testing the protector 10 while it is disconnected from at least one of the frontal contact pins 114 but preferably both in house and outside line connecting frontal contact pins 114. The protector testing and switching circuitry is powered by the batteries 140.

Figure 4:
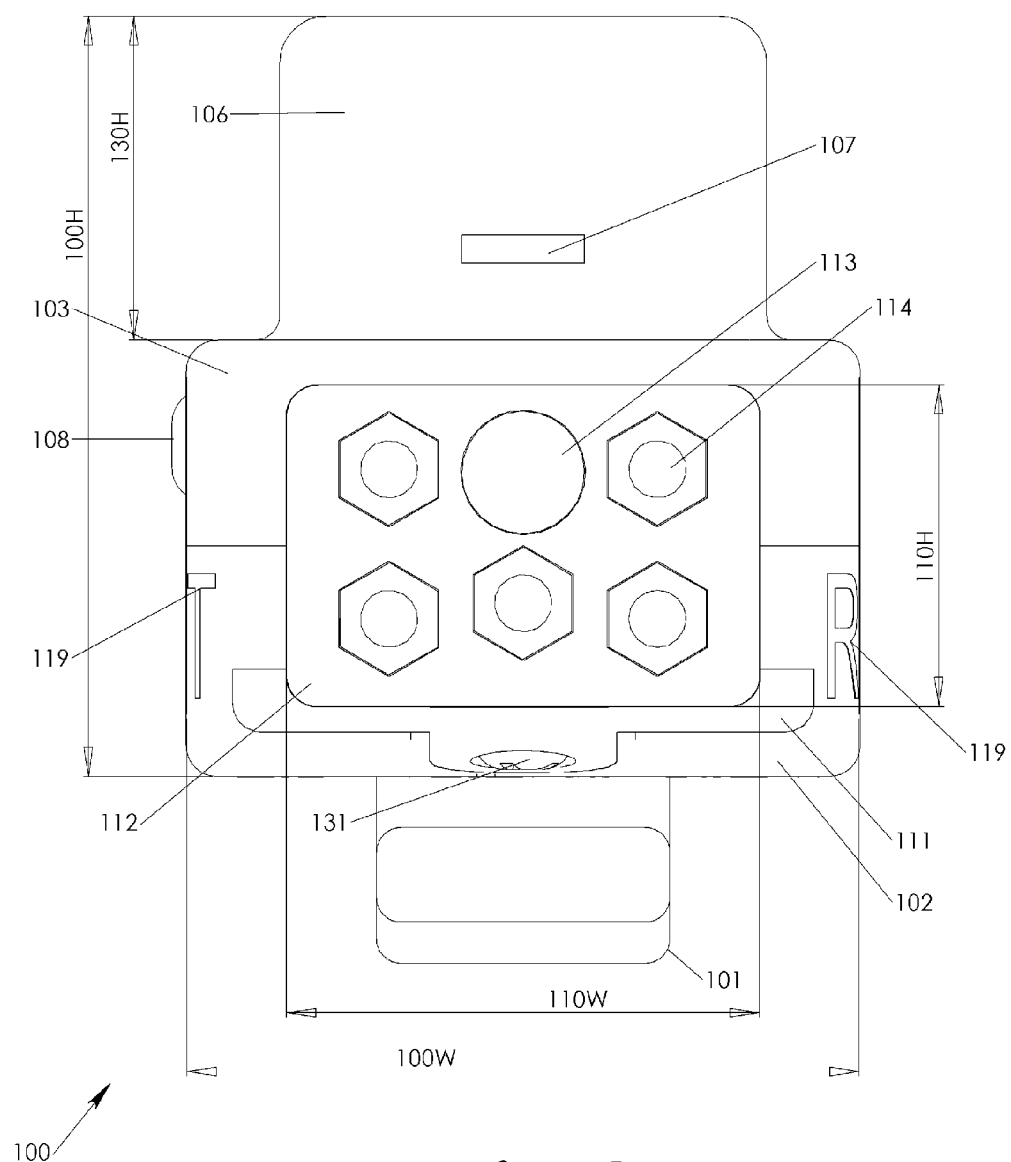
FIG. 4 is a frontal view of the telephone line tester of FIG. 1.

The telephone line tester 100 preferably also includes a light source 113 in the preferred configuration of a well known LED embedded in the insertion front face 112 of the telephone line tester 100. The LED 113 has a cross section that is sufficiently small so that it is conveniently embedded in between the contact pins 114 without compromising the structural integrity of the insertion end housing 1122 as may be well appreciated by anyone skilled in the art. In particular and referring to FIGS. 4, 5 and the well known 5-terminal type telephone line connection standard, the substantially rectangular outer protrusion boundary provides for two parallel rows with a total of up to five frontal connector sites on the insertion front face 12. In case of a male connector as configured at the insertion front face 112, up to five frontal contact pins 114 are positioned at these connector sites. The present invention includes embodiments in which one or more of the contact terminals 114 are well known female connectors positioned at these connector sites. In that case and as may be well appreciated by anyone skilled in the art, the configuration of protector contacts 11 may be equally varied between male pins and female connectors. Also in that case and as may be well appreciated by anyone skilled in the art, the protector receiving contacts 118 may be oppositely configured such that male pins 11 and/or female connectors 11 of the protector 10 would fit together with female connectors 118 and/or male pins 118.

These frontal contact pins 114 extend from the insertion front face 112 in a connection direction that is substantially perpendicular with respect to the insertion front face 12. The frontal contact pins 114 are fixed in a rigid insertion end housing 1122. The LED 113 is fitted in between the two frontal contact pins 114 of the top row such that light is emitted from the insertion front face 112 centering substantially parallel along the connection direction. Due to the small scale of the LED 113, it may be embedded without compromising the structural rigidity of the insertion end housing 1122. The insertion end housing 1122 is preferably a separate housing component that interlocks with the housing bottom and top portions 102 and 103 via interlock ribs 1121. In that way, the telephone line tester 100 may be eventually adapted to variations of and/or to the well known 5-terminal type telephone line connector standard.

The test and light switch 108 is preferably configured as a push switch. It may also switch the light source 113 with the batteries 140 simultaneously with activating the protector testing and switching circuitry. The batteries 140 power also a visual protector condition indicator 107 and optional electrical relay(s) 152 that are also preferable part of the protector testing and switching circuitry. The visual protector condition indicator 107 is preferably a dual light LED providing a first distinct light such as green light and a second distinct light such as red light. The first distinct light may correspond to a protector good condition in which all of the protector's 10 fuse(s) is/are good. The second distinct light may correspond to a protector bad condition in which at least one of the protector's 10 fuse(s) is/are bad. The relays 152 provide for a direct through switching of the protector 10 in case the batteries 140 are dead. The relays 152 provide also for a insulated through connection of the telephone lines that is completely electrically separated from other well known circuitry elements of the testing and switching circuitry.

The protector testing and switching circuitry preferably further includes a protector through switch 151 that may incorporate a switch lever 104 that extends through the housing 102/103 and that is positioned with respect to the protector connector socket 105 such that it is switched by the protector 10 while the protector 10 is connected to the protector connector socket 105. The through switch 151 is in structural interaction with the lever 104 such that the lever's 104 depression by the protector 10 is passed on to the through switch unit 151 for electrically switching the testing and switching circuitry in a well known fashion and as may be appreciated by anyone skilled in the art.

In particular, the lever 104 is configured and positioned such that it acts together with the switching unit 151 as a protector housing contacting switch 104/151 positioned with respect to the protector connector socket 105 such that it is switched by a protector housing 12 of the protector 10 while the protector 10 is connected to the protector connector socket 105. For that purpose, the protector connector socket 105 is laterally extending from the elongate housing 102/103 and oriented with respect to the elongate housing 102/103 such that a first side face 19 of the protector housing 12 is in immediate and substantial parallel proximity to a second side face 1031 of the elongate housing 102/103, and wherein the protector housing contacting switch 104/151 with its through switch lever 104 is embedded in the second side face 1031. In that way, the protector housing contacting switch 104/151 preferably acts as and is a mechanical switch with its lever 104 extending above the second side face 1031. Consequently, it is depressed and actuated while the first side face 19 is in immediate and substantial parallel proximity to the second side face 1031.

Figure 5:
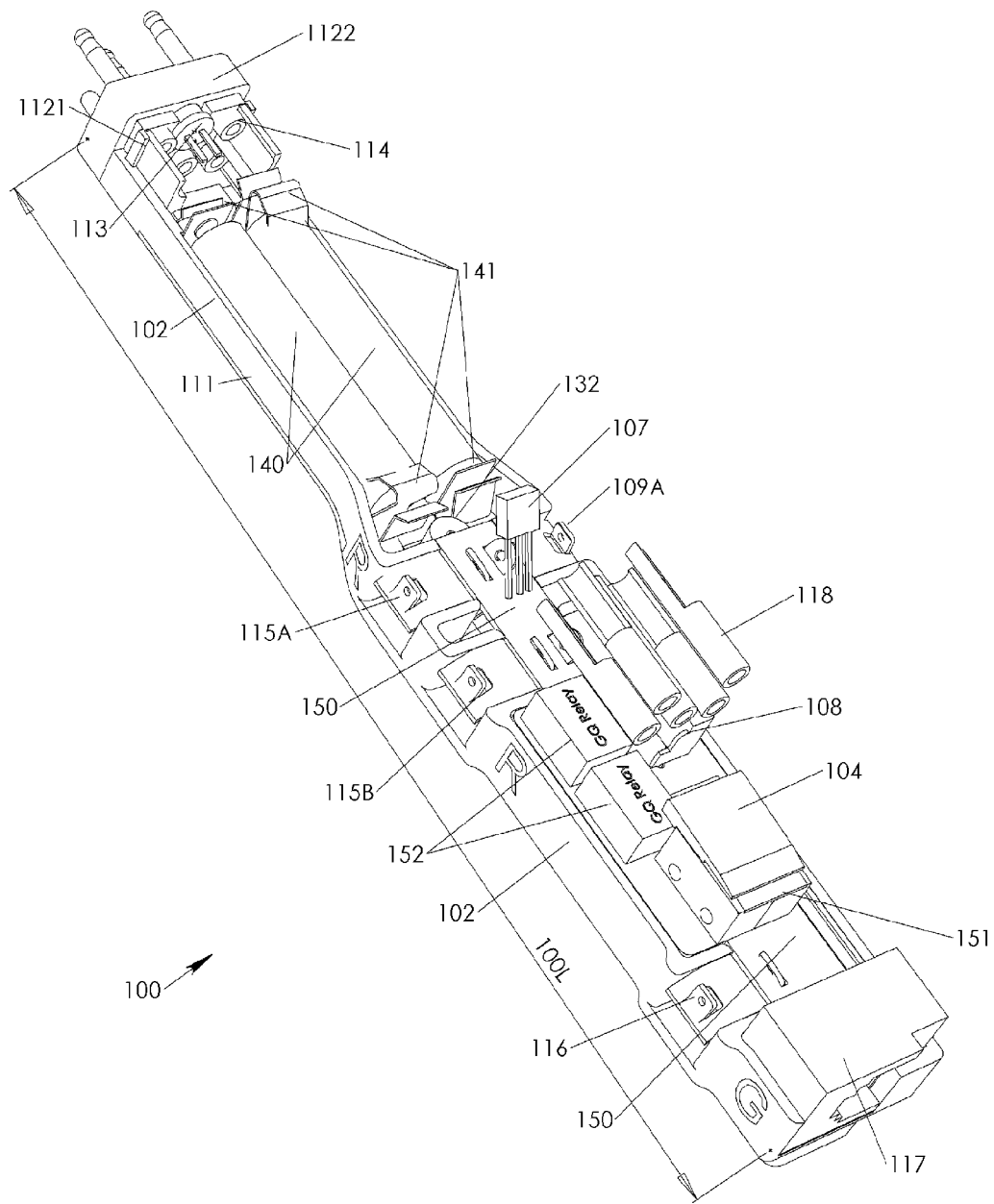
FIG. 5 is the second perspective view of the preferred telephone line tester with a top housing portion removed.

Referring to FIG. 5, the protector through switch 151, LED 113, dual light LED 107, battery contacts 141, relay(s) 152, protector receiving contacts 118, a jack connector 117 as well as tip, ring and ground connect terminals 109A, 109B, 115A, 115B and 116 are conductively connected either directly or via cables to a circuit board 150 of the testing and switching circuitry as may be well appreciated by anyone skilled in the art. Other well known elements such as resistor(s), transistor(s) and the like may also be part of the testing and switching circuitry in particular for generating a testing signal for the protector 10 via receiving contacts 118 and for transforming the protector 10 response to that testing signal for the protector condition indicator as may be also well appreciated by anyone skilled in the art. For a more detailed description of the terminals 109A, 109B, 115A, 115B, 116 and jack connector 117 it is referred to the cross referenced patent of the same inventor. Eventual cables are hidden in FIG. 5 for clarity.

The multiple functions of the telephone line tester 100 described above are integrated in a highly compact housing including housing top and bottom portions 103, 102, protector connector socket 105, insertion end housing 1122, housing cover 106 and battery lid 111, all preferably made of injection molded plastic material. The housing bottom portion 102 features a pen clip 101 such that the telephone line tester 100 having an overall length 100L of less than 160 mm may be conveniently carried in a shirt pocket. A main overall height 100H of the telephone line tester 100 housing without the pen clip 101 is about 31 mm and an overall width 110W is less than 27.5 mm. The battery lid 111 under hooks at one end into the bottom housing 102 and on the opposite end is fixed by a battery lid screw 131. The battery lid screw 131 may be screwed in a lid screw socket 132 that may be part of the housing bottom portion 102 and/or that may be exclusively part of the housing top portion 103. In that way, the battery lid screw 131 may hold housing top and bottom portions 103 and 102 together. Various labels 119 may identify the individual terminals 109A, 109B, 115A, 115B, 116 as well as the test and light switch 107.

Within the overall length 100L are fitted the rear portion 120, center portion 130, and the frontal access shaft 110. The rear portion 120 is about equally long as the protector housing length 10L. The center portion 130 has a height 130H that is about equal to the protector height 10H. The frontal access shaft 110 is at least as long as the protector housing length 10L for an unimpeded insertion into a to be tested 5-terminal type telephone line connector eventually deeply recessed between other protectors 10 connected immediately adjacent other 5-terminal type telephone line connectors as may be well appreciated by anyone skilled in the art.

At an initial step during telephone line testing, a protector 10 is removed from its 5-terminal type telephone line connector. At that initial step and by manually actuating the test and light switch 108, the telephone line tester 100 may already be employed as a flash light to identify the location of the to be tested connector and its protector 10. The removed protector 10 may be connected to the connector socket 105 and tested by the telephone line tester 100 again by manually actuating the test and light switch 108 while monitoring the dual light LED 107. The to be tested 5-terminal type connector may then be visually inspected with assistance of the front side LED 113. Next, the telephone line tester 100 may be approached and connected with its frontal contact pins 114 to the to be tested connector.

Due to the front side LED 113, unobstructed illumination of the to be tested connector is warranted to the very moment the frontal contact pins 114 are connected. This substantially assists in an efficient alignment and connection of the telephone line tester 100 with the to be tested connector without need for an additional flash light. Especially in cases of aged to be tested connectors having eventually corroded and bent receiving contacts, a precise alignment of the telephone line tester 100 with front side illumination may significantly reduce risks of further structural damage to the receiving contacts of the to be tested connector.

Once the telephone line tester 100 is conductively connected with its frontal contact pins 114 to the to be tested connector, the terminals 109A, 109B, 115A, 115B, 116 and/or the jack connector 117 may be accessed for in house and/or out side line testing as described in more detail in the cross referenced patent. At the same time, the previously tested protector 10 secures the in house and out side lines while it is connected to the connector socket 105. Once the testing is completed, the telephone line tester 100 is again removed and the protector 10 reconnected to the tested connector.

Accordingly, the scope of the invention as described in the figures and the specification above is set forth the following claims and their legal equivalent:

What is claimed is:

1. A telephone line tester having a protector connector socket for use with a protector, said telephone line tester comprising:
    a power source;
    a power switch;
    a protector connector socket; and
    protector testing circuitry configured to electrically connect a protector to corresponding frontal contact terminals of said telephone line tester while said protector is connected to said protector connector socket, wherein:
        said protector testing circuitry is configured to disconnect said protector from at least one of said frontal contact terminals and test said protector while said protector is connected to said protector connector socket;
        said testing circuitry is configured to be activated in response to activation of said power switch; and
        said protector testing circuitry is configured to be powered by said power source.

2. The telephone line tester of claim 1, wherein said power source is one or more batteries.

3. The telephone line tester of claim 2, further comprising a 5-terminal type telephone line connector,
    wherein said one or more batteries comprises two AAAA type batteries fitted in a frontal access shaft of said telephone line tester, and
    wherein said frontal access shaft has an outer cross section boundary that is substantially the same size as an outer protrusion contour of said 5-terminal type telephone line connector.

4. The telephone line tester of claim 1, further comprising a light source configured to be powered by said power source.

5. The telephone line tester of claim 4, wherein said light source is an LED embedded in a front face of said telephone line tester and embedded in between at least two of said frontal contact terminals.

6. The telephone line tester of claim 5, wherein at least one of said frontal contact terminals is a contact pin extending from said front face.

7. The telephone line tester of claim 4, wherein said power switch is configured to activate said light source.

8. The telephone line tester of claim 1, wherein said protector testing circuitry comprises a protector condition indicator configured to be powered by said power source.

9. The telephone line tester of claim 8, wherein said protector condition indicator is a dual light LED configured to provide a first distinct light corresponding to a protector good condition and a second distinct light corresponding to a protector bad condition.

10. A telephone line tester having a protector connector socket for use with a protector, said telephone line tester comprising:
    a protector connector socket;
    a protector through switch; and
    protector switching circuitry configured to electrically connect a protector to corresponding frontal contact terminals of said telephone line tester while said protector is connected to said protector connector socket and while said protector through switch is actuated, wherein said protector switching circuitry includes said protector through switch.

11. The telephone line tester of claim 10, wherein said protector through switch is positioned with respect to said protector connector socket such that said protector through switch is configured to be actuated by said protector while said protector is connected to said protector connector socket.

12. The telephone line tester of claim 10, wherein said protector switching circuitry further comprises protector testing circuitry including a protector condition indicator.

13. The telephone line tester of claim 12, wherein said protector condition indicator is a dual light LED configured to provide a first distinct light corresponding to a protector good condition and a second distinct light corresponding to a protector bad condition.

14. The telephone line tester of claim 12, further comprising a power switch, wherein said protector testing circuitry is configured to be activated by said power switch.

15. The telephone line tester of claim 14, wherein said power switch also switches a light source at a front face of said telephone line tester.

16. A telephone line tester having a protector connector socket for use with a protector, said telephone line tester comprising:
    a protector connector socket;
    a switch positioned with respect to said protector connector socket such that said switch is configured to be switched by a protector housing of a protector while said protector is connected to said protector connector socket,
    wherein said protector connector socket extends laterally from an elongate housing of said telephone line tester and is oriented with respect to said elongate housing such that, while said protector is coupled to said protector connector socket, a side face of said protector housing is substantially parallel and proximate to a side face of said elongate housing, and
    wherein said switch is embedded in said side face of said elongate housing.

17. The telephone line tester of claim 16, wherein said switch has a switching lever extending above said side face of said elongate housing, the lever configured to be depressed while said protector is connected to said protector socket.

18. A telephone line tester comprising a 5-terminal type compatible telephone line connector having a front face with up to five frontal connector sites, and a connection direction substantially perpendicular with respect to said front face, said 5-terminal type compatible telephone line connector comprising a light source embedded in between at least two of said frontal connector sites and configured to emit light from said front face substantially parallel to said connection direction,
    wherein said telephone line tester includes a protector testing circuitry, and
    wherein said protector testing circuitry and said light source are switched on by a single power switch at substantially the same time.

* * * * *